(12) United States Patent
Wang et al.

(10) Patent No.: US 10,467,645 B2
(45) Date of Patent: Nov. 5, 2019

(54) FRAUD PREVENTION SYSTEMS AND METHODS FOR A PRICE COMPARISON SYSTEM

(71) Applicant: Wal-Mart Stores, Inc., Bentonville, AR (US)

(72) Inventors: Joseph Y. Wang, San Bruno, CA (US); Venkata Syam Prakash Rapaka, Mountain View, CA (US); Vivek Parekh, Fremont, CA (US); Paul Kay Hatch, Bentonville, AR (US); Ronald G. Benson, San Francisco, CA (US); Srirama M. Bolla, San Jose, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

(21) Appl. No.: 14/292,681

(22) Filed: May 30, 2014

(65) Prior Publication Data
US 2014/0278883 A1 Sep. 18, 2014

Related U.S. Application Data

(63) Continuation-in-part of application No. 13/754,620, filed on Jan. 30, 2013.

(51) Int. Cl.
G06Q 30/00 (2012.01)
G06Q 30/02 (2012.01)

(52) U.S. Cl.
CPC ..... *G06Q 30/0225* (2013.01); *G06Q 30/0234* (2013.01)

(58) Field of Classification Search
USPC ...................................... 705/14.34
See application file for complete search history.

(56) References Cited

U.S. PATENT DOCUMENTS 5,226,519 A 7/1993 Dewoolfson
5,642,279 A 6/1997 Bloomberg et al.
(Continued)

FOREIGN PATENT DOCUMENTS

WO WO1996001454 A1 1/1996
WO 1997046985 12/1997
(Continued)

OTHER PUBLICATIONS

Microsoft Computer Dictionary, Fifth Edition, 2002, Microsoft Press, p. 23.*
(Continued)

*Primary Examiner* — Matthew T Sittner
*Assistant Examiner* — Michael I Ezewoko
(74) *Attorney, Agent, or Firm* — Bryan Cave Leighton Paisner LLP

(57) ABSTRACT

Systems and methods are disclosed for evaluating a transaction concluded at a POS (point of sale) device. Prices for competitive retail stores within a geographic region of the POS may be evaluated after concluding a transaction. Price differences between items and corresponding prices in the third party data are identified. Where the purchase price exceeds the corresponding third-party price, a credit is assigned to the customer, such as in the form of a gift card or code that may be redeemed in a subsequent transaction. Credits may also be assigned to a debit card associated with a user, either with or without applying some multiplier. Transactions may be compared to past transaction of a user in order to detect fraud. Recent activity may be flagged as potentially fraudulent and reviewed before providing a credit.

21 Claims, 6 Drawing Sheets

(56) References Cited

U.S. PATENT DOCUMENTS

| | | | |
|---|---|---|---|
| 5,873,069 A | 2/1999 | Reuhl et al. | |
| 5,883,968 A | 3/1999 | Welch | |
| 6,016,480 A | 1/2000 | Houvener | |
| 6,076,070 A | 6/2000 | Stack | |
| 6,732,081 B2 | 5/2004 | Nicholson | |
| 6,811,030 B1 | 11/2004 | Compton | |
| 6,912,507 B1 | 6/2005 | Phillips et al. | |
| 7,069,240 B2 | 6/2006 | Spero et al. | |
| 7,082,415 B1 | 7/2006 | Robinson et al. | |
| 7,099,833 B1 | 8/2006 | Sundaresan | |
| 7,107,225 B1 | 9/2006 | McClung, III | |
| 7,198,192 B2 | 4/2007 | Page et al. | |
| 7,200,576 B2 | 4/2007 | Steeves et al. | |
| 7,455,226 B1 | 11/2008 | Hammond | |
| 7,580,860 B2 | 8/2009 | Junger | |
| 7,580,873 B1 | 8/2009 | Silver et al. | |
| 7,606,731 B2 | 10/2009 | McClung, III | |
| 7,657,470 B1 | 2/2010 | Delurgio et al. | |
| 7,660,738 B1 | 2/2010 | Siegel et al. | |
| 7,740,172 B1 | 6/2010 | Hubert et al. | |
| 7,746,510 B2 | 6/2010 | Pandipati | |
| 7,783,515 B1 | 8/2010 | Kumar et al. | |
| 7,792,709 B1 | 9/2010 | Trandal et al. | |
| 7,865,427 B2 * | 1/2011 | Wright | G06Q 20/04 705/35 |
| 7,881,991 B2 | 2/2011 | Darrell | |
| 8,006,900 B2 | 8/2011 | Grigsby et al. | |
| 8,027,439 B2 * | 9/2011 | Zoldi | G06Q 40/02 379/114.14 |
| 8,046,260 B2 | 10/2011 | Haddad et al. | |
| 8,108,287 B2 | 1/2012 | Kirch et al. | |
| 8,160,984 B2 | 4/2012 | Hunt et al. | |
| 8,175,918 B2 | 5/2012 | Cooper et al. | |
| 8,180,682 B2 | 5/2012 | Narayanaswami et al. | |
| 8,249,916 B2 | 8/2012 | Gworek | |
| 8,346,634 B2 | 1/2013 | Shiftan | |
| 8,356,750 B2 | 1/2013 | Hammond | |
| 8,448,859 B2 | 5/2013 | Goncalves | |
| 8,458,010 B1 | 6/2013 | Geoffrin et al. | |
| 8,494,909 B2 | 7/2013 | Goncalves | |
| 8,511,574 B1 | 8/2013 | Yen et al. | |
| 8,615,422 B1 | 12/2013 | Alkasimi et al. | |
| 8,793,760 B2 | 7/2014 | Raper | |
| 10,032,185 B2 | 7/2018 | Watfa et al. | |
| 2002/0052756 A1 | 5/2002 | Lomangino | |
| 2002/0069118 A1 | 6/2002 | Zylstra | |
| 2002/0198772 A1 | 12/2002 | Bates et al. | |
| 2004/0088230 A1 | 5/2004 | Elliott | |
| 2005/0160014 A1 * | 7/2005 | Moss et al. | 705/26 |
| 2005/0240525 A1 * | 10/2005 | Bagayatkar | G06Q 20/102 705/40 |
| 2005/0240535 A1 | 10/2005 | Grooms | |
| 2005/0246225 A1 | 11/2005 | Jorgensen | |
| 2006/0015403 A1 | 1/2006 | McClung, III | |
| 2006/0261160 A1 | 11/2006 | Garner | |
| 2007/0021973 A1 | 1/2007 | Stremier | |
| 2007/0073592 A1 | 3/2007 | Perry et al. | |
| 2007/0094087 A1 | 4/2007 | Mitchell | |
| 2007/0174073 A1 | 7/2007 | Hunscher | |
| 2007/0265914 A1 | 11/2007 | McClung, III | |
| 2008/0005017 A1 | 1/2008 | Poster | |
| 2008/0073429 A1 | 3/2008 | Oesterling et al. | |
| 2008/0086411 A1 | 4/2008 | Olson | |
| 2008/0140576 A1 * | 6/2008 | Lewis | G06Q 10/0635 705/67 |
| 2008/0149725 A1 | 6/2008 | Rosenbaum | |
| 2008/0201226 A1 | 8/2008 | Carlson et al. | |
| 2008/0255951 A1 | 10/2008 | Miller et al. | |
| 2009/0018965 A1 | 1/2009 | Neydavood | |
| 2009/0048934 A1 | 2/2009 | Haddad | |
| 2009/0138358 A1 | 5/2009 | Gonen | |
| 2009/0271265 A1 | 10/2009 | Lay | |
| 2009/0299887 A1 | 12/2009 | Shiran et al. | |
| 2009/0327062 A1 * | 12/2009 | Botes | 705/14.17 |
| 2010/0042488 A1 | 2/2010 | McClung, III | |
| 2010/0306080 A1 | 12/2010 | Trandal et al. | |
| 2011/0066483 A1 * | 3/2011 | Salmon et al. | 705/14.17 |
| 2011/0225098 A1 | 9/2011 | Wolff | |
| 2011/0307318 A1 | 12/2011 | LaPorte et al. | |
| 2012/0018501 A1 | 1/2012 | Wilen | |
| 2012/0078682 A1 | 3/2012 | Pinsley et al. | |
| 2012/0078739 A1 | 3/2012 | Maraz | |
| 2012/0095853 A1 | 4/2012 | von Bose et al. | |
| 2012/0143722 A1 * | 6/2012 | John | G06Q 30/06 705/26.41 |
| 2012/0221430 A1 | 8/2012 | Naghmouchi et al. | |
| 2012/0271759 A1 | 10/2012 | Lee | |
| 2012/0323663 A1 | 12/2012 | Leach | |
| 2013/0030898 A1 | 1/2013 | Burton | |
| 2013/0054433 A1 * | 2/2013 | Giard et al. | 705/34 |
| 2013/0066698 A1 | 3/2013 | Levy et al. | |
| 2013/0246143 A1 | 9/2013 | Hunt | |
| 2013/0317896 A1 | 11/2013 | Liberty | |
| 2014/0032061 A1 | 1/2014 | Wulf et al. | |
| 2014/0058938 A1 | 2/2014 | McClung, III | |
| 2014/0074665 A1 | 3/2014 | Stewart | |
| 2014/0095350 A1 | 4/2014 | Carr et al. | |
| 2014/0097237 A1 | 4/2014 | Delfer | |
| 2014/0108272 A1 | 4/2014 | Mayo | |
| 2014/0122325 A1 * | 5/2014 | Zoldi et al. | 705/39 |
| 2014/0172697 A1 * | 6/2014 | Ward | G06Q 20/4016 705/39 |
| 2014/0201037 A1 | 7/2014 | Mallawarachchi et al. | |
| 2016/0148300 A1 | 5/2016 | Carr et al. | |
| 2017/0193542 A1 | 7/2017 | Rapaka et al. | |

FOREIGN PATENT DOCUMENTS

| | | |
|---|---|---|
| WO | WO1999064979 A1 | 12/1999 |
| WO | 2012131401 | 10/2012 |
| WO | 2013159152 | 10/2013 |

OTHER PUBLICATIONS

Mind—A Brief Introduction, John R. Searle, 2004, Oxford University Press, pp. 62-67.*

What is Thought, Eric Baum, The MIT Press, 2004, pp. 33-65.*

Robotics, Science and Systems III, Wolfram Burgard, Oliver Brock, and Cyrill Stachniss, The MIT Press, 2008, pp. 41-48.*

Language and Mind, Chomsky, Oxford University Press, 2005, p. 62.*

Computing the Mind, Shimon Edelman, Oxford University Press, 2008, pp. 26-31.*

Noetics, Lawrence Krader, 2010, Peter Lang Publishing, pp. 551-553.*

Britannica Concise Encyclopedia, Encyclopedia Britannica, 2006, p. 537.*

Computing the Mind, Oxford University Press, Edelman, 2008, pp. xi-36.*

Algorithms+Data Structures=Programs, 1976, pp. xii-55.*

Metaphors We Live By, Lakoff, University of Chicago Press, 1980, pp. ix-55.*

Frame Analysis, Goffman, Northeastern University Press, 1974, pp. 139, 301-344.*

Final Office Action (U.S. Appl. No. 14/292,633); Notification dated Feb. 12, 2016.

Final Office Action (U.S. Appl. No. 14/292,701); Notification dated May 4, 2016.

Final Office Action (U.S. Appl. No. 14/292,629); Notification dated May 2, 2016.

Non-Final Office Action dated Nov. 3, 2016 for Utility U.S. Appl. No. 14/292,633.

Non-Final Office Action dated Nov. 3, 2016 for Utility U.S. Appl. No. 14/292,701.

Non-Final Office Action dated Nov. 17, 2016 for Utility U.S. Appl. No. 14/292,629.

Non-Final Office Action dated Dec. 1, 2016 for Utility U.S. Appl. No. 14/292,451.

Data Warehousing, Academic Press, 2001, chapter(s) 7-9 2001.

Algorithms+Data Structures=Programs, 1976, pp. xii-55 1976.

(56) References Cited

OTHER PUBLICATIONS

HCI remixed: reflections on works that have influenced the HCI community, MIT Press, 2008, pp. 275-279 2008.
Why a Diagram is (Sometimes) Worth Ten Thousand Words, Larkin, Simon, Congnitive Science, 1987, pp. 65-100 1987.
Streetlights and Shadows, MIT Press, 2009, pp. 33-47 2009.
The future of the internet—and how to stop it, Yale University Press, 2008, Chapter(s) 1-9, [emphasis pp. 11-18] 2008.
Database Management System, Himalaya Publishing House, 2008, chapter(s) 2-3; prior art used in this Office Action 2008.
Advanced Artificial Intelligence, Shi, World Scientific, 2011, pp. 430-458 2011.
Data Mining, Elsevier, Han and Kamber, 2006, pp. 234-274 2006.

\* cited by examiner

FRAUD PREVENTION SYSTEMS AND METHODS FOR A PRICE COMPARISON SYSTEM

RELATED APPLICATIONS

This application is a continuation-in-part of U.S. application Ser. No. 13/754,620, filed Jan. 30, 2013. That application is incorporated herein by reference for all purposes.

BACKGROUND

Field of the Invention

This invention relates to systems and methods for providing competitive pricing to consumers.

Background of the Invention

For a retailer such as Wal-Mart it is very important that customers receive the lowest possible price on items for sale and that customers are aware that the prices at Wal-Mart provide the best deal. For customers, it is likewise important to find the best possible deal on purchases. For both the retailer and the customer it can be difficult to evaluate pricing. Competitors may transmit advertisements on various media and publish advertisements and coupons in various publications. A customer must therefore wade through all of these for all items in order to find the best deal. Once found, price matching may enable a customer to buy all items at the same store rather than visit various retail stores. However, the time spent in reviewing advertisements each week is nonetheless inconvenient.

The systems and methods disclosed herein provide an improved approach for a retailer to ensure that prices paid by a customer are competitive and to ensure that the customer is aware of savings obtained by shopping at a retailer.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
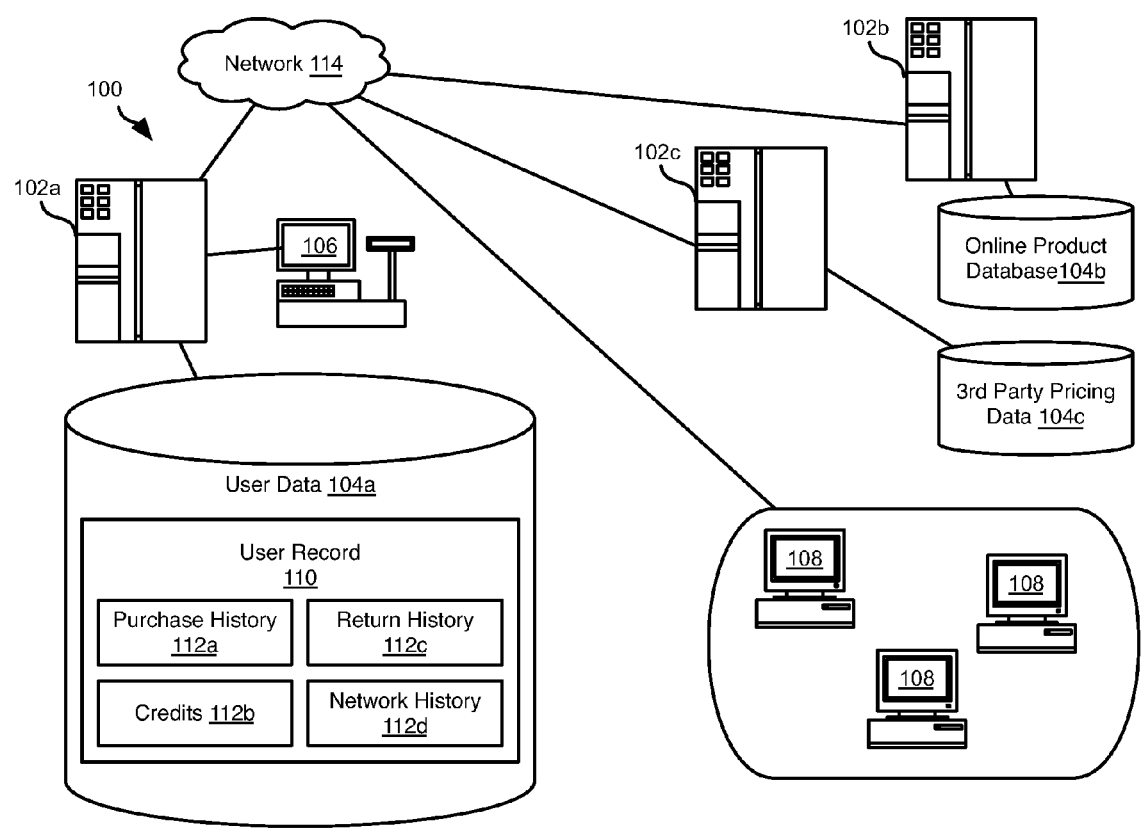
FIG. 1 is a schematic block diagram of a network environment suitable for implementing methods in accordance with embodiments of the invention.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The invention has been developed in response to the present state of the art and, in particular, in response to the problems and needs in the art that have not yet been fully solved by currently available apparatus and methods. In some embodiments, a customer may conduct a transaction at a POS (point of sale) device. The transaction may include the purchase of one or more items each having a purchase price paid by the customer. The transaction may be recorded in a transaction record, e.g. receipt, wherein each purchased item is represented by an item identifier. In some instances, the item identifier may be sufficient to also determine the price paid such that the transaction record need not be included in the transaction record. For example, a product database may record the price for a given item identifier at a given date and/or time. In other embodiments, the transaction record may also include the price. The transaction record may be a paper receipt printed for the customer and may also be an electronic record generated for a transaction by the POS and transmitted to a server.

A method may be executed with respect to the transaction. For example, subsequent to the first transaction, a server system may identify for each item identifier of at least a portion of the one or more item identifiers of a transaction, a third party record, the third party record corresponding to the each item identifier and having a third party price. For example, the third party record may include a competitor's advertisement or a transcription of pricing information from an advertisement by an entity that gathers pricing data.

The server system may identify one or more discounted identifiers of the one or more item identifiers, the third party price of the third party record corresponding to the discounted identifiers being less than the price paid for the one or more discounted identifiers by one or more price differences. The server system may then credit an account associated with the user identifier with an amount corresponding to the one or more price difference. The server system may then subsequently apply the amount toward a purchase price of a second transact subsequent to the first transaction.

In some embodiments, recent purchasing activity may be compared to historical purchasing activity of a customer in order to detect potentially fraudulent transactions. For example, if recent activity varies from historical activity in one or more aspects, a flag may be set for a transaction. Flagged transactions may be evaluated automatically or by a person in order to either clear the flag or determine that the transaction does indicate fraud such that credits will not be assigned for price differences.

A flag may be set if a frequency with which a user generates transactions or submits transactions for review is significantly greater than a frequency indicated by historical shopping history. A flag may be set if a frequency with which a user generates transactions or submits transactions for review is significantly greater than a frequency indicated by historical shopping history.

A flag may be set if recent return activity of a customer is significantly greater than historic return activity. A flag may be set if an amount of a credit assigned based on a price differences for a transaction is significantly larger than a typical credit assigned for past transactions. A flag may be set if a category of goods for recent transactions does not belong to a category of goods purchased in historical transactions of a user. A flag may be set if timing (day of the week, time of day, etc.) of a recent transaction is different than for typical transactions of a user. A flag may be set if the computing device or other aspect of a networked connection between a user and a server system is different than for past transactions. A flag may be set if a location of a transaction is a threshold amount away from a typical location of past transactions. A flag may be set if a price of the transaction more than a threshold amount greater than a typical price of past transactions.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1, a network environment 100 may be used to implement methods as described herein. The environment 100 may include a server system 102a associated with a corporate parent or controlling entity having one or more retail establishments associated therewith. The retail establishments may house point of sale devices (POS) 106 on which transactions may be concluded. Records of transactions may be transmitted to the server system 102a by the POS 106a at the various retail establishments.

In some embodiments, data regarding third parties and used according to the methods disclosed herein may be gathered from various sources. For example, a server 102b of one entity may provide a website providing access to an online product database 104b, which may include access to product records including product prices and corresponding product identifiers and other descriptive information. A database 104b may also include a publicly accessible website or the like listing advertisements for products offered for sale in a retail establishment.

In some embodiments, data regarding third parties may be obtained from a server system 102c operated by a data gathering entity. For example, the server system 102c may store third party pricing data 104c. The pricing data may include data gathered from advertisements published by retail entities. Pricing data could include entries including fields such as an entity identifier, location, price, product identifier (e.g. UPC), a date the product was offered at the price, or the like. The pricing data may be gathered and be provided within N day of Hours from when it was published. For example, pricing data may be provided the next day, 48 hours, or 72 hours, after initially publicized.

The server system 102a may access and use user data 104a which may include a plurality of user records 110. A user record 110 may be associated with a particular user who may be identified by a unique customer identifier. The user may have access to some or all of the data in the user record and a user name and password may be associated with the user record and with which a user may log in the server system 102a in order to obtain access to the user record 110.

The user record 110 may include such data as a purchase history 112a including a record of previous transactions conducted by the user associated with the user record 110 at the various POSs 106 associated with the server system 102a. The user record may further include a record of credits 112b assigned to the user associated with the user record as well as a redemption or usage of such credits. The methods by which the credits 112b are assigned and used are described in greater detail below.

In some embodiments, fraud detection methods as described herein may evaluate the purchase history 112a, credits 112b, and one or more other type of information about a user associated with the user record 110. For example, a return history 112c of a user that indicated which items were returned by the user and when may be included in the user record 110. A network history 112d may store aspects of a user's electronic interactions with the server system 102a, such as a type of device used by the user when interacting with the server system 102a, an identifier of the device, a type of browser used, the internet protocol (IP) address of the device, browser user-agent, and the like, may be stored as part of the network history 112d.

Customers may access the server system 102a in order to participate in the methods described herein by means of user computing devices 108 that may be embodied as desktop or laptop computers, tablet computers, smart phones, or the like. Communication among servers 102a-102c, POS 106, and workstations 108 may occur over a network 114 such as the Internet, local area network (LAN), wide area network (WAN) or any other network topology. Communication may be over any wired or wireless connection.

Figure 2:
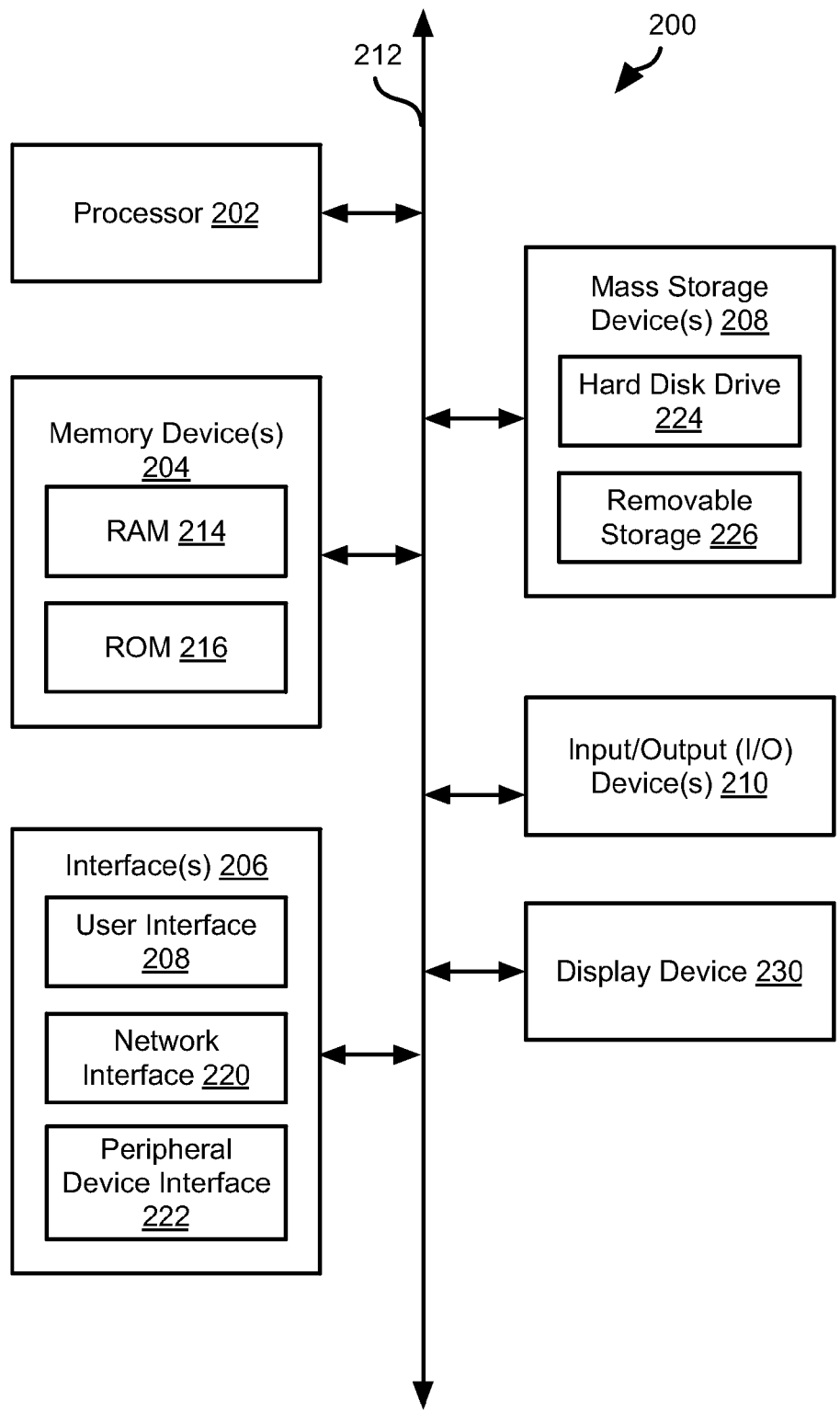
FIG. 2 is schematic block diagram of a computer system suitable for implementing methods in accordance with embodiments of the invention.

FIG. 2 is a block diagram illustrating an example computing device 200. Computing device 200 may be used to perform various procedures, such as those discussed herein. A server system 102a-102c, POS 106, and user computing device 108 may have some or all of the attributes of the computing device 200. Computing device 200 can function as a server, a client, or any other computing entity. Computing device can perform various monitoring functions as discussed herein, and can execute one or more application programs, such as the application programs described herein. Computing device 200 can be any of a wide variety of computing devices, such as a desktop computer, a notebook computer, a server computer, a handheld computer, tablet computer and the like. A server system 102a-102c may include one or more computing devices 200 each including one or more processors.

Computing device 200 includes one or more processor(s) 202, one or more memory device(s) 204, one or more interface(s) 206, one or more mass storage device(s) 208, one or more Input/Output (I/O) device(s) 210, and a display device 230 all of which are coupled to a bus 212. Processor(s) 202 include one or more processors or controllers that execute instructions stored in memory device(s) 204 and/or mass storage device(s) 208. Processor(s) 202 may also include various types of computer-readable media, such as cache memory.

Memory device(s) 204 include various computer-readable media, such as volatile memory (e.g., random access memory (RAM) 214) and/or nonvolatile memory (e.g., read-only memory (ROM) 216). Memory device(s) 204 may also include rewritable ROM, such as Flash memory.

Mass storage device(s) 208 include various computer readable media, such as magnetic tapes, magnetic disks, optical disks, solid-state memory (e.g., Flash memory), and so forth. As shown in FIG. 2, a particular mass storage device is a hard disk drive 224. Various drives may also be included in mass storage device(s) 208 to enable reading from and/or writing to the various computer readable media. Mass storage device(s) 208 include removable media 226 and/or non-removable media.

I/O device(s) 210 include various devices that allow data and/or other information to be input to or retrieved from computing device 200. Example I/O device(s) 210 include cursor control devices, keyboards, keypads, microphones, monitors or other display devices, speakers, printers, network interface cards, modems, lenses, CCDs or other image capture devices, and the like.

Display device 230 includes any type of device capable of displaying information to one or more users of computing device 200. Examples of display device 230 include a monitor, display terminal, video projection device, and the like.

Interface(s) 206 include various interfaces that allow computing device 200 to interact with other systems, devices, or computing environments. Example interface(s) 206 include any number of different network interfaces 220, such as interfaces to local area networks (LANs), wide area networks (WANs), wireless networks, and the Internet. Other interface(s) include user interface 218 and peripheral device interface 222. The interface(s) 206 may also include one or more user interface elements 218. The interface(s) 206 may also include one or more peripheral interfaces such as interfaces for printers, pointing devices (mice, track pad, etc.), keyboards, and the like.

Bus 212 allows processor(s) 202, memory device(s) 204, interface(s) 206, mass storage device(s) 208, and I/O device(s) 210 to communicate with one another, as well as other devices or components coupled to bus 212. Bus 212 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 200, and are executed by processor(s) 202. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 3:
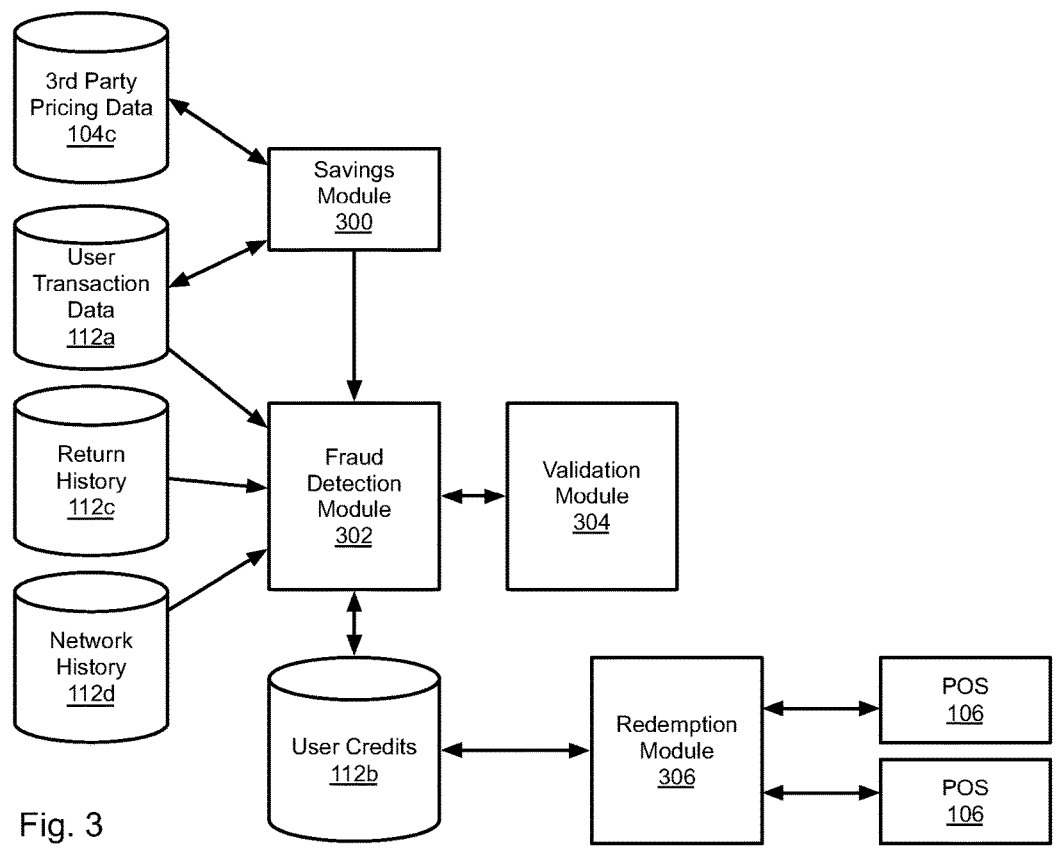
FIG. 3 is a schematic block diagram of components implementing methods in accordance with an embodiment of the present invention.

Referring to FIG. 3, a savings module 300 may ingest data such as a transaction record (e.g. receipt) from among user transaction data 112a. The savings module 300 may further take as input third party pricing data 104c. The third party pricing data 104c may be pricing data from different entities than the entity that conducted the transaction represented by the transaction record. The third party pricing data 104c may be data that reflecting prices offered on a same day as a date on which the transaction represented by the transaction record took place. The savings module 300 compares the prices of items in the transaction record to prices for corresponding items in the third party pricing data 104c. The savings module then assigns user credits 112b to an account of the user associated with the transaction or otherwise attributes credits 112b to the user.

A fraud detection module 302 may receive a credit as determined by the savings module 300 and determine whether the transaction on which it is based is potentially fraudulent. The fraud detection module 302 may also take as inputs user transaction data 112a, return history 112c, network history 112d, as well as past credits 112b assigned to the user account with which the transaction is associated. In some embodiments, the fraud detection module 302 may also attempt to detect multiple accounts from the same user. For example, when a user creates an account, a validation message (SMS text, email, etc.) may be transmitted using contact information provided by the user when creating the account. If the user does not respond (e.g. send a reply text or email) to the validation message, the account will not be created. Likewise, if a notification transmitted during processing of a transaction according to the methods disclosed herein is found to be undeliverable, the transaction may be flagged as fraudulent or potentially fraudulent.

A validation module 304 may receive flagged transactions from the fraud detection module 302 that the fraud detection module 302 determines to be potentially fraudulent. The validation module 304 may present a report or some other visual representation of factors determined by the fraud detection module 302 to indicate fraudulent activity. The validation module 304 may further define an interface in which a representative of a retailer may determine whether the transaction should be deemed fraudulent or not. The validation module 304 may receive this input and the fraud detection module may take appropriate action based on the input from the validation module 304.

A redemption module 306 may interact with one or more POSs 106 to apply the credits to subsequent transactions. For example, the redemption module 306 may issue a gift card, code for a gift card, assign credits to a gift card, or otherwise provide a message containing information that a user may use at a POS 106 in order to apply the credits to a transaction. The redemption module 306 may interact with the POS 102 in order to validate a gift card, code, or other representation of credits presented at the POS 106 when processing payment for a transaction. For example, a cashier or device may receive the code, scan the gift card, swipe the gift card through a magnetic reader, or otherwise input a representation of the gift card into the POS 106. The POS 106 may then transmit this information, or a representation thereof, to the redemption module 306. If the transmitted information is valid, the redemption module 302 may transmit authorization to the POS 106 to apply corresponding credits to the transaction. Otherwise, the redemption module 306 may transmit a rejection of the transmitted information and the POS 106 will not apply any corresponding credits to the transaction.

Figure 4:
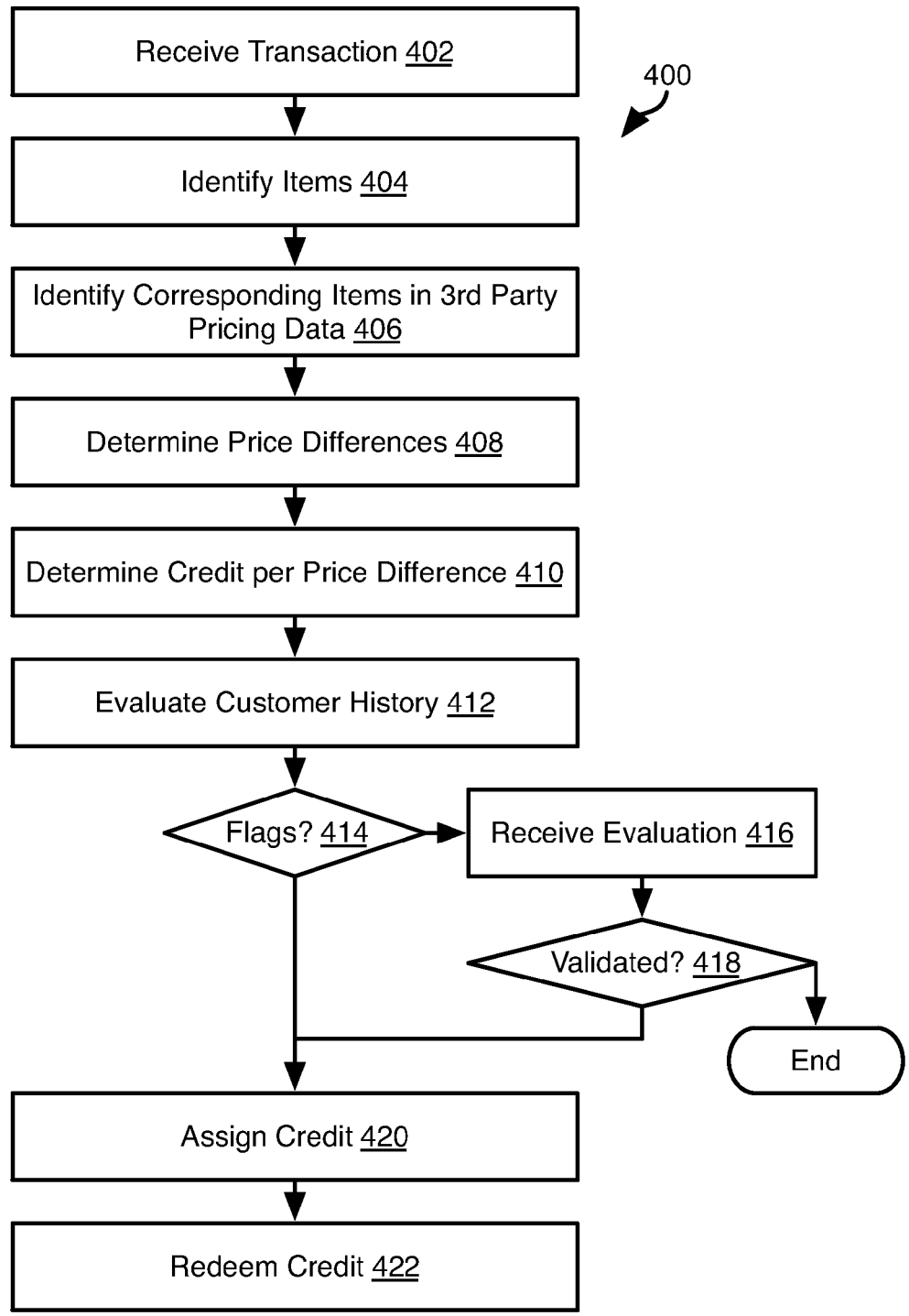
FIG. 4 is a process flow diagram of a method for providing a credit based on price differences with fraud estimation in accordance with an embodiment of the present invention.

FIG. 4 illustrates an example of a method 400 that may be used to provide credits to users based on price difference between a price paid and third party prices. The method 400 may include receiving 402 a record of a transaction. A record of a transaction may include such data as a date of the transaction, a location where the transaction occurred, an identifier of the POS at which the transaction occurred, an identifier of the customer that was a party to the transaction, and other information. The transaction record may further include various <product,price> entries that list a product identifier and a price paid for the product corresponding to that product identifier. Other data may include taxes paid for the entire transaction and/or for specific item identifiers. Any discounts due to coupons or price matching may also be noted for each item identifier for which such price adjustments were applied. The transaction record may be transmitted from a POS 106 to a server system 102a. The transaction record may additionally or alternatively transmitted to a customer in electronic form and/or by means of a printed copy. The transaction record may be associated by the server system with the user data 110 of a user with whom the transaction was conducted, such as using a credit card number or identifier supplied to the POS at the time of concluding the transaction and included in, or associated with, the transaction record. For example, the transaction record may be in the form of an electronic receipt provided to the customer.

The step of receiving 402 the receipt may include receiving a transaction identifier from a user computing device 108 through a portal such as a website hosted by the server system 102. The transaction identifier may uniquely identify the transaction record and may be printed on a paper receipt to enable the customer to take advantage of the methods disclosed herein and/or for other purposes. Receiving 402 the receipt may include receiving, by the server system 102a, a selection of the transaction in a listing of transactions presented in a portal provided by the server system 102a or by an application for viewing receipts stored locally on a user computing device 108. For example, transactions may be made available to a user in the form of electronic receipts stored in an account of a user and recording transactions conducted by the user. In some embodiments, all transactions of a user may be submitted for review according to the method 400. For example, where a user has installed a mobile application for interfacing with the server system 102a, all transactions of a user may be automatically submitted for review according to the method 400. In some embodiments, transactions may be transmitted to the server system by 1) the user scanning a bar code or other optical code printed on a receipt with a user device 108, 2) the user device 108 transmitting some representation of the optical code to the server system 102a and 3) the server system 102a identifying a transaction record corresponding to the transmitted representation of the optical code.

In some embodiments, the server system 102a may limit a number of receipts that may be submitted by a customer, e.g. for a specific user account. For example, N transactions may be process per week for the customer. In some embodiments, multiple limits on receipts for multiple corresponding time period may be imposed. For example, only N transactions per week or M transactions per month may be allowed by the server system 102a to be processed according to the methods described herein for purposes of determining a credit based on price differences.

The method 400 may further include identifying 404 from the received transaction record the item identifiers of items purchased as part of the transaction and the price for each item. For example, fields of the form <item identifier, price paid> may be filled with the item identifier and purchase price for some or all items listed as having been purchased in a transaction record. The item identifier may be a proprietary product identifier for a product catalog of a merchant or a universal identifier (e.g. a universal product code (UPC)).

For some or all of the identified 404 items, corresponding items may be identified in third party pricing data. In particular, a lowest price for each item identifier may be identified among the third party pricing data. As noted above, pricing data may include advertised prices exclusively. Pricing data may also include the sale price for some items regardless of whether that price is advertised. Pricing data searched to identify corresponding third party prices may be limited to pricing data for retail stores within a threshold proximity of the POS or retail location identified by the transaction record that is the subject of the method 400. For example, the threshold may reference a geographical or political region (neighborhood, city, county, state, etc.) or may specify a circular area having a radius R with respect to the POS or store location indicated in the transaction record.

Identifying the lowest price among the third party pricing data for each item identifier of at least a portion of the item identifiers in a transaction may include determining a per-unit cost for corresponding items in the third party pricing data. For example, if a product corresponding to an item identifier is offered for sale as a buy N at price P per unit and get M free, then the price of an individual instance of that product may be prorated to be $(N/(N+M))*P$. This prorated price may then be used for purposes of determining whether a price is the lowest as compared to prices offered for that product by other entities and for comparison with the purchase price for the corresponding item identifier in the transaction record. In some instances, where items are sold by a unit of measure, such as weight, the cost per unit weight for an item may also be determined form the third party pricing data. For example, this approach may be applied to produce, meat, or the products sold by weight, volume, or some other unit of measurement. In some instances, products may be offered for sale at a certain price at limit of N per customer. Accordingly, where a third party promotion imposes such a limit, this limit may likewise be imposed when assigning credits. For example, where a third party price is offered only for N items and a customer buys M items, M being greater than N, the customer may be assigned a credit based on the difference between the purchase price paid for N of the M items and the third party price. For the remaining M-N items a credit may still be assigned if some other promotion or third party price is found to be lower than the purchase price paid.

The method 400 may further include, for each item identifier of some or all of the item identifiers of the transaction record determining 408 a price difference between the lowest price found for the each item identifier in the third party pricing data. A credit for the transaction record according to the price differences determined at step 408 may then be determined 410. For example, a credit equal to $P_t-P_3$ may be assigned for each item identifier for which $P_t-P_3$ is a positive number, where to $P_t$ is the price paid as indicated by the transaction record and $P_3$ is the lowest corresponding third party price identified at step 406 for the item identifier.

The sum of the credits for each item identifier as determined 410 may then be assigned to the user associated with the transaction record, such as by assigning a credit equal to the sum of the credits to an account associated with a same user identifier as included in the transaction record.

The method 400 may further include evaluating 412 a customer history with respect to the received 402 transaction or recent transactions of a user in order to determine if the received 402 transaction or recent transactions of a user indicate fraudulent activity. If flags are found 414 to have been generated based on the evaluation 412, then the transaction and/or other data determined by the evaluation 412 to indicate fraudulent activity may be transmitted for display to a representative of a retailer. An evaluation of this information may then be received 416. If the evaluation validates 418 the transaction (indicates it is not likely fraudulent), then steps 420 and 422 may be performed as described below. If not, then the method 400 may end, i.e. no credits are assigned 420 based on the transaction.

In some embodiment, the method 400 may include assigning 420 a credit, such as by generating a gift card, gift code, coupon, or some other data used to uniquely identify an account to which the credit was assigned or to represent the value of the credit. In some embodiments, credits assigned according to the methods described herein may be transmitted for display in a portal with listing credits for various transactions. Upon selecting of a transaction a portal may display information about a specific transaction and the credits assigned based thereon according to the methods described herein. In some embodiments, a portal may be displayed summarizing information for a specific transaction, the portal including a map displaying the location of third party stores at which a lower price was found and for which a credit was assigned according to the methods disclosed herein.

The method 400 may further include redeeming 422 the credit. The credit may be redeemed in any manner known in the art. For example, a code may be transmitted to the user. The code may then be presented at the POS 106. The code may be input to the POS that either independently validates the code or transmits it to the server system 102a. Upon determining that the code is valid, such as by receiving a response from the server system indicating that it is valid, the POS 106 may apply the corresponding credit to a transaction. The code may include text (letters, numbers, other typographic symbols), an optical code (bar code, quick response (QR) code, or the like). In some embodiments, the server system 102a may invoke mailing of a gift card to the customer or crediting of an account of the customer that has a card with a magnetic strip encoding an account identifier (e.g. debit card).

In some embodiments, the credit may be assigned to a debit card account. For example, a debit card having a checking account associated therewith or used exclusively by means of a debit card. For example, an AM-EX BLUE-BIRD account provided by cooperation between WAL-MART and AMERICAN EXPRESS. The credit may also be multiplied by some multiplier greater than one, such as two, and the result of the multiplication assigned to the account of a user. In some embodiments, a user may be presented a choice between 1) a gift card or code or other assignment of credit to the user and 2) assignment of a credit to a debit card after applying some multiple. In some embodiments, a credit may be assigned in the form of a simple credit, gift card, or gift code by default.

Figure 5A:
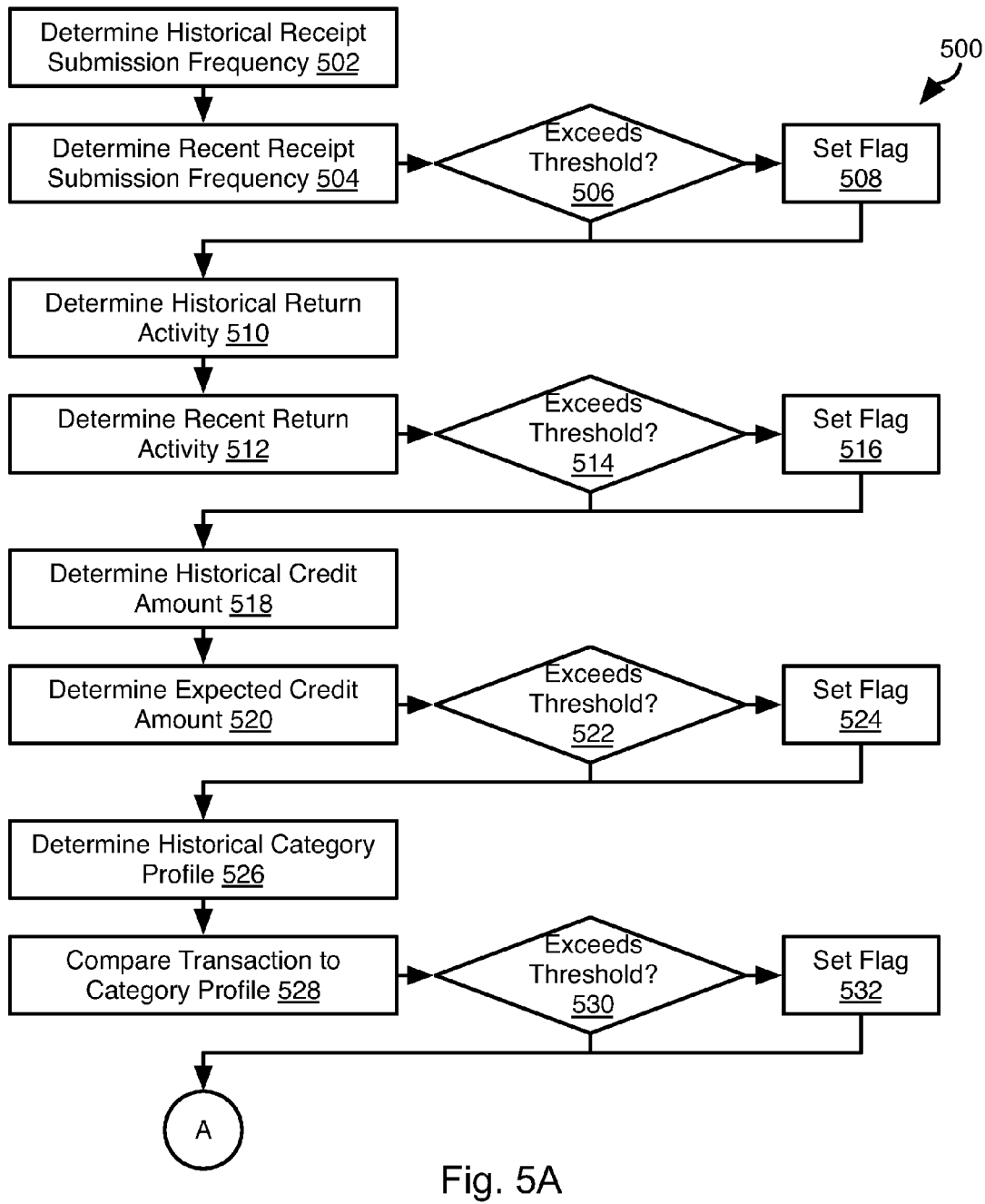
FIGS. 5A and 5B are a process flow diagram of a method for flagging potentially fraudulent transactions in accordance with an embodiment of the present invention.
Figure 5B:
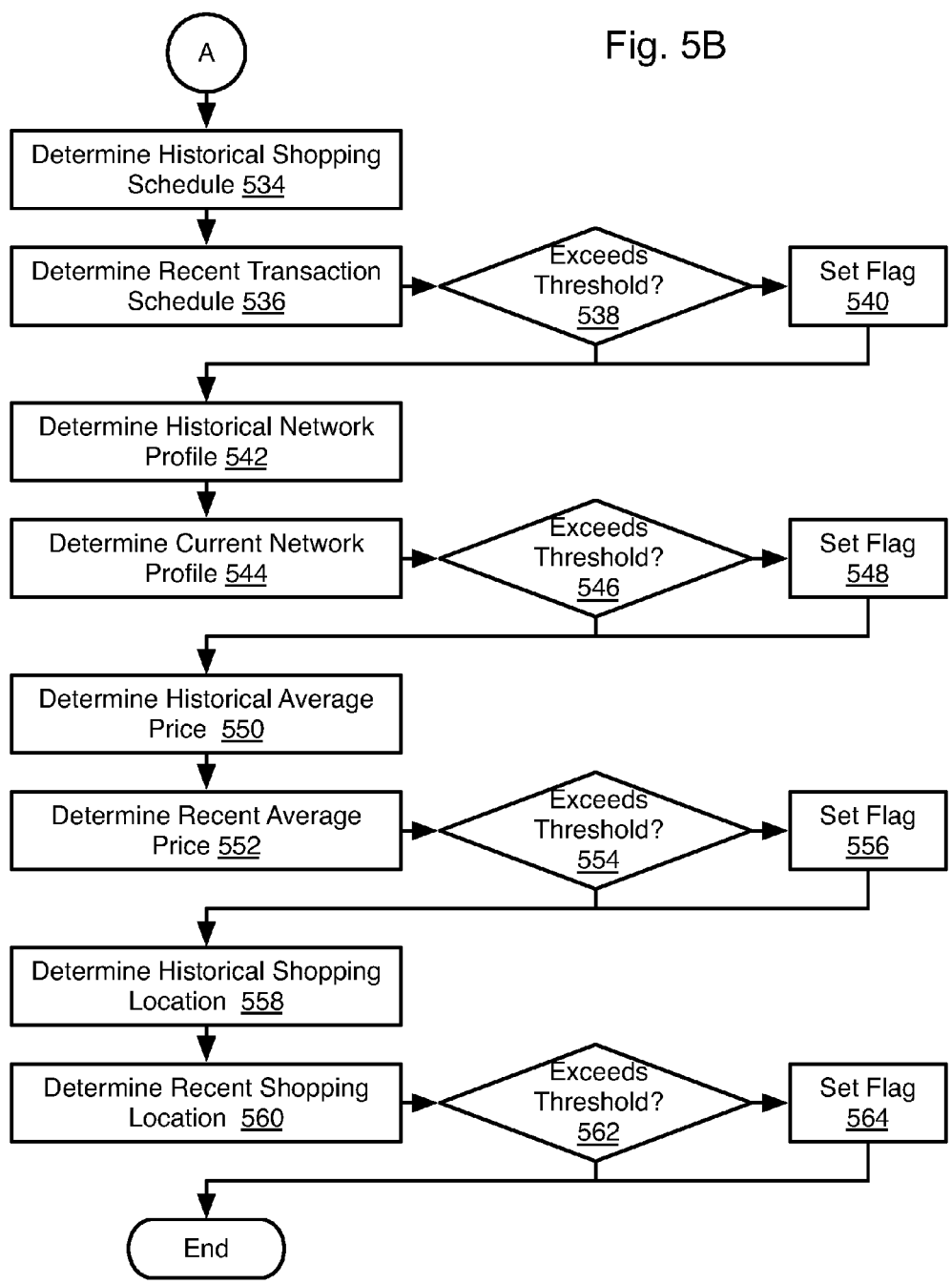

Referring to FIG. 5, a method 500 may be executed to determine whether a transaction is likely fraudulent, e.g. identify potentially fraudulent transactions. The method 500 may be executed with respect to some or all of the user data 110 associated with a user account of a user identifier identifying the purchaser in a transaction record. For purposes of the method 500, "recent" may indicate occurrence within a window up until a date of a transaction being evaluated or the time at which a transaction occurs. For example, a window of one week, two weeks, one month, or some other length. For purposes of the method 500, "historical" may indicate occurrence within a window preceding the window defined as "recent." The "historical" window may include all user activity preceding the "recent" window or may be limited to a finite length, e.g. three months, six months, a year, or some other time range, preceding the "recent" window. In some embodiments, the "historical" window is longer than the "recent" window, e.g. more than two times as long, more than 10 times as long, or some other multiple of the length of the "recent" window.

The method 500 may include determining 502 a historical receipt submission frequency for the user identifier and determining 504 a recent receipt submission frequency for the user identifier. Submission frequency may be defined as a number of receipts submitted for review according to the method 400 in a given window (recent or historical). In some embodiments, the method 400 is invoked upon request of a user, such as through a portal or other interface to the server system 102a with respect to a transaction recorded in the user data 110 for a particular user identifier.

Submission frequency may be defined as an average, e.g. an average of X transactions per unit time submitted within a given window. The submission frequency may also take into account a purchase price of a transaction, e.g. an average of transactions worth Y dollars were submitted for the user identifier per unit time within the given window.

The difference between the recent submission frequency and the historical submission frequency may be evaluated with respect to a threshold condition. For example the threshold condition may include the following expression being true R−H>T or R>A*H, where R is the recent submission frequency, H is the historical submission frequency, A is a number greater than one, and T is a threshold value. In other embodiments, R and H may be inputs to some function, the output of which may be compared to a threshold value to determine whether fraud is suspected. If the threshold condition is found 506 to have been met, a flag may be set 508 indicating that the recent submission frequency indicates potential fraud.

The method 500 may include determining 510 a historical return frequency for the user identifier and determining 512 a recent return frequency for the user identifier. Return frequency may be defined as the average number of items returned in a given window (recent or historical) or the average number of transactions of which one or more items purchased in the transaction were returned in the given window.

Return frequency may be defined as an average, e.g. an average of X returns (items or transactions) per unit time within a given window. The return frequency may also take into account a purchase price of a transaction, e.g. an average of items worth Y dollars (as indicated by a purchase price for the items) were returned for the user identifier per unit time within the given window.

The difference between the recent submission frequency and the historical return frequency may be evaluated with respect to a threshold condition. For example the threshold condition may include the following expression being true R−H>T or R>A*T, where R is the recent return frequency, H is the historical return frequency, A is a number greater than one, and T is a threshold value. In other embodiments, R and H may be inputs to some function, the output of which may be compared to a threshold value to determine whether fraud is suspected. If the threshold condition is found 514 to have been met, a flag may be set 516 indicating that the recent return frequency indicates potential fraud.

The method 500 may include determining 518 a historical credit amount for the user identifier and determining 520 a recent credit amount for the user identifier. The recent and historical credit amounts may be defined as the average amount of credits assigned based on a difference between a price paid and third party pricing data in the recent window and historical window, respectively. The credits assigned may be credits assigned according to the method 400 of FIG. 4. The credit amount may be the average credit per transaction, i.e. the total amount of credits in a given window divided by the number of transactions for which evaluation according to the method 400 was performed. Alternatively, the credit amount may be the average amount of credits per unit time, i.e. a total amount of credits assigned within a given window divided by the length of the window. In some embodiments, rather than evaluate the recent credit amount based on the entire recent window, the recent credit amount may be the credit based on a difference in a price paid and third party pricing data for a current transaction according to the method 400, i.e. the transaction with respect to which the method 400 and method 500 are being performed.

The difference between the recent credit amount and the historical credit amount may be evaluated with respect to a threshold condition. For example the threshold condition may include the following expression being true R−H>T or R>A*T, where R is the recent credit amount, H is the historical credit amount, A is a number greater than one, and T is a threshold value. In other embodiments, R and H may be inputs to some function, the output of which may be compared to a threshold value to determine whether fraud is suspected. If the threshold condition is found 522 to have been met, a flag may be set 524 indicating that the recent credit amount indicates potential fraud.

The method 500 may include determining 526 a historical category profile for the user identifier and determining 528 a recent category profile for the user identifier. The historical category profile may reflect the categories, sub-categories, and/or departments of good purchased by a user associated with the user identifier during the historical window. For example, products may be represented by product records that are nodes in a hierarchy in which each product is a node that is a descendent of a category node that is a descendent of another category node and so on up to a department node including a collection of category nodes or a root node from which all category nodes and product record nodes are descendants.

Accordingly, for each item purchased in the window, a counter may be incremented for each category in the product hierarchy of which the product record associated with the each item is a descendent. In this manner, both the categories represented in the purchases and the frequency with which products belonging to that category are purchased are recorded. The collection of counters may be the historical category profile or may be processed or otherwise transformed to obtain the historical category profile.

The recent category profile may be computed in the same manner as the historical category profile with respect to items purchased within the recent window. Alternatively, the recent category profile may be the categories in the product hierarchy represented in the transaction with respect to which the method 500 is being performed. In a like manner, the profile based on a single transaction may indicate for each category represented the number of items of the transaction belonging to the each category.

The difference between the recent category profile and the historical category profile may be evaluated with respect to a threshold condition. For example the cosine ratio of the various counters for the various categories represented in the recent and historical category profiles may be calculated. As known in the art, the cosine ratio of tow vectors increases with similarity of the two vectors. Accordingly, if the cosine ratio is below some threshold, the recent and historical category profiles may be deemed so different as to indicate fraud. If this threshold condition, or some other threshold based on a measure of similarity of the category profiles, is found 530 to have been met, a flag may be set 532 indicating that the differences between the recent and historical category profiles potentially indicate fraud.

The method 500 may include determining 534 a historical shopping schedule for the user identifier and determining 536 a recent transaction schedule for the user identifier. The historical shopping schedule may include determining based on the dates and times of previous transactions for the user identifier, the probability that a transaction will occur at a given time of day or day of the week. For example, for a generic day, regardless of day of the week, a likelihood that a transaction will occur in a plurality of time ranges may be calculated, e.g. the probability that a transaction will occur within a given hour of the day or some other division of the day into periods of finite length. Additionally or alternatively, the probability that a transaction will occur on a given day of the week may be determined based on the days of the week on which prior transactions of the customer have occurred. Additionally or alternatively, the probability that a transaction will occur within a given hour on a given day of the week may be determined based on the time of day and days of the week on which prior transactions of the customer have occurred. Additionally or alternatively, the probability that a transaction will occur on a given day of the month may be determined based on the days of the month on which previous transactions have occurred.

Determining 536 the recent transaction schedule may be performed in the same manner as for the historical transaction schedule with respect to transactions occurring in the recent window. Alternatively the recent transaction schedule may simply be some or all of the day of the month, day of the week, and time of day on which the transaction occurred which is the subject of the method 500.

The difference between the historical shopping schedule and recent shopping schedule may be evaluated with respect to a threshold condition. For example, the historical shopping schedule may be expressed in terms of the probability of a transaction occurring during a given time period in the day, a given day of the week, a given time period of a given day of the week, or a given day of the month. The probabilities of the historical shopping schedule for some or all of the time of day, day of the week, and day of the month on which the transaction that is the subject of the method 500 occurred may be evaluated with respect to one or more thresholds. In particular, where the probability is below a threshold for a transaction to occur at a given time of day, on a given day of the week, at a given time of day of a given day of the week, or a given day of the month, then the threshold condition may be deemed to have been exceeded.

In some embodiments, multiple probabilities may be combined and compared to a threshold. For example, for the day of the week of the transaction that is the subject of the method 500 occurs, a first probability of the transaction occurring on that day of the week may be retrieved from the historical shopping profile. For the time of day of the transaction that is the subject of the method 500 occurs, a second probability of the transaction occurring in a time period including that time of day may be retrieved from the historical shopping profile. For the time of day on which the transaction that is the subject of the method 500 occurs, a second probability of the transaction occurring in a time period including that time of day may be retrieved from the historical shopping profile. For the time of day and day of the week on which the transaction that is the subject of the method 500 occurs, a third probability of the transaction occurring in a time period including that time of day on that day of the week may be retrieved from the historical shopping profile. For the day of the month that the transaction that is the subject of the method 500 occurs, a fourth probability of the transaction occurring on that day of the month may be retrieved from the historical shopping profile.

Some or all of the first, second, third, and fourth probabilities may be combined such as by summing or weighting and summing to obtain a combined measure of the probability of a transaction occurring when the transaction that is the subject of the method 500 occurred. This score may then be compared to a threshold condition. In particular, if the score is below a predetermined threshold then the historical shopping profile may be deemed to indicate that the transaction is unlikely and therefore potentially fraudulent.

If this threshold condition, or some other threshold based on a measure of probability of a transaction occurring, is found 538 to have been met, a flag may be set 540 indicating that the differences between the recent and historical category profiles potentially indicate fraud.

The method 500 may include determining 542 a historical network profile and determining 544 a recent network profile for the user identifier. The historical and recent profiles may be based on attributes of software and devices used by a user when interacting with the server system 102a. Interactions may include ordering products using an ecommerce site, requesting a determination of credits according to the method 400, browsing an online catalog, or other interactions with a web portal or some other interface. Attributes of software and devices used by the user may include a device type, operating system, browser, internet protocol (IP) address, browser user agent, or other attributes of the user device, software on the user device, or actions taken by the user device with respect to the server system 102a.

Differences between the historical network profile and recent network profile. If the differences are found 546 to exceed a threshold, a flag may be set 548. The degree of difference may be determined in any manner. For example, values may be specified for any of the parameters specified above. That is, the historical network profile may include <parameter,value> pairs and the recent network profile may include corresponding <parameter, value> pairs. The number of parameters between the two profiles that have different values may be counted. If this count exceeds a threshold, the flag may be set 548. For some parameters, a degree of difference may be measured. For example, an IP address is of the form xxx.xxx.xxx.xxx. Accordingly, a difference between the values of the IP address may be measured, with digits to the left being given greater weight than digits to the right.

The method 500 may include determining 550 a historical average price for the user identifier and determining 552 a recent average price for the user identifier. The recent and historical average price may be defined as the average price of items in transactions for the user identifier for the recent and historical windows, respectively. In some embodiments, rather than evaluate the recent average price based on transactions occurring within the entire recent window, the recent average price may be an average price of items in a current transaction according to the method 400, i.e. the transaction with respect to which the method 400 and method 500 are being performed. Alternatively, the largest price among the prices for the current transaction may be used in the place of the average price for the processing described below.

The difference between the recent average price and the historical average price may be evaluated with respect to a threshold condition. For example the threshold condition may include the following expression being true R−H>T or R>A*T, where R is the recent credit amount, H is the historical credit amount, T is a threshold value, and A is a number greater than one. In other embodiments, R and H may be inputs to some function, the output of which may be compared to a threshold value to determine whether fraud is suspected. If the threshold condition is found 522 to have been met, a flag may be set 524 indicating that the recent credit amount indicates potential fraud.

The method 500 may include determining 558 a historical shopping location for the user identifier and determining 560 a recent shopping location for the user identifier. The recent and historical shopping location may be defined as the average location of stores at which transactions for the user identifier were conducted in the recent and historical windows, respectively. In particular, locations for each transaction expressed as coordinates may be averaged to determine an average location. Alternatively, the average location may be chosen to be the store at which the most transactions were conducted in the window. Store locations may be stored in the form of a code or identifier included in the transaction record for transactions. In some embodiments, rather than evaluate the recent shopping location based on transactions occurring within the entire recent window, the recent shopping location may be the location at which the current transaction occurred.

The difference between the recent shopping location and the historical shopping location may be evaluated with respect to a threshold condition. For example the threshold condition may include the following expression being true $\|R-H\|>T$, where R is the recent shopping location, H is the historical shopping location, and T is a threshold value. In other embodiments, R and H may be inputs to some function, the output of which may be compared to a threshold value to determine whether fraud is suspected. If the threshold condition is found 562 to have been met, a flag may be set 564 indicating that the recent credit amount indicates potential fraud.

Other aspects of a transaction may also be evaluated with respect to historical transactions and recent transactions (which may be a single transaction that is the subject of the method 500). For example, items purchased may be targeted to a specific demographic of users. If items purchased in the historical window indicate a first demographic (age, gender, income) and the items in the recent window indicate a different demographic, then the transaction may be flagged as potentially fraudulent.

In some embodiments, payment method used in transactions conducted in the historical and recent windows may be compared. Where the payment method is different between the recent and historical transactions, the transaction may be flagged as potentially fraudulent. For example, if a different credit card number is used in the recent transactions than was used for some or all of the historical transactions. The thresholds used at steps 506, 514, 522, 530, 538, 546, 554, and 562 may be different from one another and may be determined based on the attributes of transactions known to be fraudulent. The flags set at steps 508, 516, 524, 532, 540, 548, 556, 564, or according to some other comparison between historical and recent activity, may each be separate variables. Accordingly, the number of flags set may be evaluated to determine whether to deem a transaction as potentially fraudulent. The various flags may have different weights. For example, each flag may be a variable having a value of 0 or 1 indicating whether the flag is set. The value of the flags may then be multiplied by weights corresponding to each flag and the weighted values may then be summed to generate a score. This score may be compared to another threshold condition to determine if the transaction should be deemed fraudulent. For example, if the score exceeds a threshold value, the transaction may be deemed fraudulent. In some embodiments, flags may have a value other than 0 and 1 that corresponds to an amount by which measured parameters exceeds or falls outside of the threshold condition evaluated at steps 506, 514, 522, 530, 538, 546, 554, and 562.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. A system comprising:
a sale terminal configured to generate user transaction data representing one or more historical transactions conducted by a user at the sale terminal;
one or more processors; and
one or more memory devices operably coupled to the one or more processors, the one or more memory devices storing executable and operational code effective to cause the one or more processors and the one or more memory devices to operate as a savings module, a fraud detection module, a validation module, and a redemption module,
wherein:
the one or more memory devices store the user transaction data for the user, a return history for the user, and a network history of the user representing a history of electronic interactions of the user with a server system;
the savings module is configured to, for a first transaction of the user, determine one or more price differences between prices paid for items of the first transaction and third party prices paid for the items;
the fraud detection module is coupled to the savings module and configured to perform:
receiving inputs including (a) the user transaction data, (b) the return history, and (c) the network history;
determining whether a difference between recent shopping activity and historical shopping activity of the user indicates fraud based on the inputs, wherein the historical shopping activity is associated with a first time period that precedes a second time period associated with the recent shopping activity, wherein the determining whether the difference between the recent shopping activity and the historical shopping activity of the user indicates fraud further comprises:
responsive to the inputs, determining that the historical shopping activity indicates a first frequency of purchase transactions during the first time period;
determining that the recent shopping activity indicates a second frequency of purchase transactions during the second time period;
evaluating whether a first difference between the second frequency of purchase transactions and the first frequency of purchase transactions exceeds a first threshold value, as defined by $R_1-H_1>T_1$, where $R_1$ is the second frequency of purchase transactions, $H_1$ is the first frequency of purchase transactions, and $T_1$ is the first threshold value;
responsive to the inputs, determining that the historical shopping activity indicates a first frequency of return transactions during the first time period;
determining that the recent shopping activity indicates a second frequency of return transactions during the second time period;
evaluating whether a second difference between the second frequency of return transactions and the first frequency of return transactions exceeds a second threshold value, as defined by $R_2-H_2>T_2$, where $R_2$ is the second frequency of return transactions, $H_2$ is the first frequency of return transactions, and $T_2$ is the second threshold value;

determining that the historical shopping activity indicates purchases among a first plurality of categories;

determining that the recent shopping activity indicates purchases among at least one second category;

evaluating whether the at least one second category belongs to one of the first plurality of categories;

determining that the historical shopping activity indicates online activity during the first time period from at least one of a first device, a first browser type, or a first internet protocol address;

determining that the recent shopping activity indicates online activity during the second time period from at least one of a second device, a second browser type, or a second internet protocol address;

evaluating a third difference between (i) the first device, the first browser type, or the first internet protocol address and (ii) the second device, the second browser type, or the second internet protocol address;

determining that the historical shopping activity indicates a first average credit per transaction during the first time period based on third party pricing data;

determining that the recent shopping activity indicates a second average credit per transaction during the second time period based on the third party pricing data; and evaluating whether a fourth difference between the second average credit per transaction and the first average credit per transaction exceeds a third threshold value; and when the difference between the recent shopping activity and the historical shopping activity indicates fraud, generating a flag with respect to the first transaction;

the validation module is coupled to the fraud detection module and is configured to (1) receive a validation decision from the fraud detection module, (2) when the validation decision indicates rejection, refrain from crediting an account associated with a user identifier identifying the user with an amount corresponding to the one or more price differences, and (3) when the difference between the recent shopping activity and the historical shopping activity does not indicate fraud and the validation decision indicates acceptance, perform at least one of: (i) crediting the account associated with the user identifier with the amount corresponding to the one or more price differences, (ii) generating a redemption code having the amount corresponding to the one or more price differences and receive a request to redeem the redemption code from the user associated with the user identifier, or (iii) issuing a gift card to the user associated with the user identifier; and the redemption module is coupled to the sale terminal, and is configured to receive transaction information related to a subsequent sale at the sale terminal and to transmit an authorization to the sale terminal when the transaction information is valid, the authorization allowing the sale terminal to apply the amount as credited, to the subsequent sale.

2. The system of claim 1, wherein the executable and operational code are further effective to identify for each item of the items of the first transaction, a third party price of the third party prices corresponding to the each item by:
identifying a geographic location of the sale terminal at which the first transaction was concluded.

3. The system of claim 2, wherein the executable and operational code are further effective to identify for each item of the items of the first transaction, the third party price of the third party prices corresponding to the each item by:
identifying as the third party price for the each item a price offered for the each item at a retail location within a threshold distance from the geographic location of the sale terminal at which the first transaction was concluded.

4. The system of claim 1, wherein the executable and operational code are further effective to receive a record of the first transaction concluded on the sale terminal by:
receiving, from a user computer, a transaction identifier.

5. The system of claim 4, wherein the executable and operational code are further effective to receive the record of the first transaction concluded on the sale terminal by:
retrieving the record of the first transaction using the transaction identifier.

6. The system of claim 1, wherein the executable and operational code are further effective to evaluate whether a difference between the second average credit per transaction and the first average credit per transaction exceeds a third threshold condition indicates fraud, is defined by $R_3-H_3>T_3$, where $R_3$ is a recent return frequency, $H_3$ is a historical return frequency, and $T_3$ is the third threshold value.

7. The system of claim 1, wherein the executable and operational code are further effective to:
identify for each item of the items of the first transaction, a third party price of the third party prices corresponding to the each item by:
identifying a geographic location of the sale terminal at which the first transaction was concluded; and
identifying as the third party price for the each item a price offered for the each item at a retail location within a threshold distance from the geographic location of the sale terminal at which the first transaction was concluded; and
receive a record of the first transaction concluded on the sale terminal by:
receiving, from a user computer, a transaction identifier.

8. The system of claim 7, wherein the executable and operational code are further effective to effective to receive a record of the first transaction concluded on the sale terminal by:
retrieving the record of the first transaction using the transaction identifier.

9. A computer program product, the computer program product being embodied in a non-transitory computer readable storage medium and comprising computer instructions for a computer system, the computer instructions causing the computer system to perform:
receiving a record of a first transaction concluded on a sale terminal, the record including a user identifier, one or more item identifiers, and a price paid for each item identifier of the one or more item identifiers;
storing the record of the first transaction in a user record as user transaction data, the user record also including a return history for a user, and a network history of the user representing a history of electronic interactions of the user with a server system;

subsequent to the first transaction, identifying for the each item identifier of at least a portion of the one or more item identifiers, a third party record, the third party record corresponding to the each item identifier and having a third party price for the each item identifier;

subsequent to the first transaction, identifying one or more discounted identifiers of the one or more item identifiers, the third party prices of the third party records corresponding to the one or more discounted identifiers being less than the price paid for the one or more discounted identifiers by one or more price differences;

evaluating recent shopping activity associated with the user identifier;

evaluating historical shopping activity associated with the user identifier based on a plurality of inputs including (1) the user transaction data, (2) the return history, and (3) the network history, the historical shopping activity including shopping activity preceding the recent shopping activity;

determining whether a difference between the recent shopping activity and the historical shopping activity indicates fraud based on the inputs, wherein the historical shopping activity is associated with a first time period that precedes a second time period associated with the recent shopping activity, wherein the determining whether the difference between the recent shopping activity and the historical shopping activity of the user indicates fraud further comprises:

responsive to the inputs, determining that the historical shopping activity indicates a first frequency of purchase transactions;

determining that the recent shopping activity indicates a second frequency of purchase transactions;

evaluating whether a first difference between the second frequency of purchase transactions and the first frequency of purchase transactions exceeds a first threshold value, as defined by $R_1 - H_1 > T_1$, where $R_1$ is the second frequency of purchase transactions, $H_1$ is the first frequency of purchase transactions, and $T_1$ is the first threshold value;

responsive to the inputs, determining that the historical shopping activity indicates a first frequency of return transactions during the first time period;

determining that the recent shopping activity indicates a second frequency of return transactions during the second time period;

evaluating whether a second difference between the second frequency of return transactions and the first frequency of return transactions exceeds a second threshold value, as defined by $R_2 - H_2 > T_2$, where $R_2$ is the second frequency of return transactions, $H_2$ is the first frequency of return transactions, and $T_2$ is the second threshold value;

determining that the historical shopping activity indicates purchases among a first plurality of categories;

determining that the recent shopping activity indicates purchases among at least one second category;

evaluating whether the at least one second category belongs to one of the first plurality of categories;

determining that the historical shopping activity indicates online activity during the first time period from at least one of a first device, a first browser type, or a first internet protocol address;

determining that the recent shopping activity indicates online activity during the second time period from at least one of a second device, a second browser type, or a second internet protocol address;

evaluating a third difference between (i) the first device, the first browser type, or the first internet protocol address and (ii) the second device, the second browser type, or the second internet protocol address;

determining that the historical shopping activity indicates a first average credit per transaction during the first time period based on third party pricing data;

determining that the recent shopping activity indicates a second average credit per transaction during the second time period based on the third party pricing data; and evaluating whether a fourth difference between the second average credit per transaction and the first average credit per transaction exceeds a third threshold value;

when the difference between the recent shopping activity and the historical shopping activity indicates fraud, generating a flag with respect to the first transaction;

receiving a validation decision;

when the validation decision indicates approval, crediting an account associated with the user identifier with an amount corresponding to the one or more price differences;

when the validation decision indicates rejection, refraining from crediting an account associated with the user identifier with the amount corresponding to the one or more price differences;

when the difference between the recent shopping activity and the historical shopping activity does not indicate fraud and the validation decision indicates acceptance, perform at least one of: (i) crediting the account associated with the user identifier with the amount corresponding to the one or more price differences, (ii) generating a redemption code having the amount corresponding to the one or more price differences and receive a request to redeem the redemption code from the user associated with the user identifier, or (iii) issuing a gift card to the user associated with the user identifier;

receiving, at the sale terminal, transaction information related to a second transaction subsequent to the first transaction;

transmitting an authorization to the sale terminal when the transaction information is valid, the authorization allowing the sale terminal to apply an amount to be credited to the second transaction subsequent to the first transaction; and applying the amount of credit in the account associated with the user identifier toward a purchase price of the second transaction subsequent to the first transaction.

10. The computer program product of claim 9, wherein the identifying the each item identifier of the at least the portion of the one or more item identifiers, the third party record, the third party record corresponding to the each item identifier and having the third party price for the each item identifier further comprises:

identifying a geographic location of the sale terminal.

11. The computer program product of claim 10, wherein the identifying the each item identifier of the at least the portion of the one or more item identifiers, the third party record, the third party record corresponding to the each item identifier and having the third party price for the each item identifier further comprises:

identifying as the third party record for the each item identifier of the at least the portion of the one or more item identifiers the third party record corresponding to a retail location within a threshold distance from the geographic location of the sale terminal.

12. The computer program product of claim 11, wherein the identifying the each item identifier of the at least the portion of the one or more item identifiers, the third party record, the third party record corresponding to the each item identifier and having the third party price for the each item identifier further comprises:
   excluding third party records corresponding to retail locations outside of the threshold distance from the geographic location.

13. The computer program product of claim 9, wherein the receiving the record of the first transaction concluded on the sale terminal further comprises:
   receiving, from a user computer, a transaction identifier.

14. The computer program product of claim 13, wherein the receiving the record of the first transaction concluded on the sale terminal further comprises:
   retrieving the record of the first transaction using the transaction identifier.

15. The computer program product of claim 9, wherein the evaluating whether a difference between the second average credit per transaction and the first average credit per transaction exceeds a third threshold condition indicates fraud, is defined by $R_3-H_3>T_3$, where $R_3$ is a recent return frequency, $H_3$ is a historical return frequency, and $T_3$ is the third threshold value.

16. The computer program product of claim 9, wherein:
   the identifying the each item identifier of the at least the portion of the one or more item identifiers, the third party record, the third party record corresponding to the each item identifier and having the third party price for the each item identifier further comprises:
      identifying a geographic location of the sale terminal; and
      identifying as the third party record for the each item identifier of the at least the portion of the one or more item identifiers the third party record corresponding to a retail location within a threshold distance from the geographic location of the sale terminal and excluding third party records corresponding to retail locations outside of the threshold distance from the geographic location; and
   the receiving the record of the first transaction concluded on the sale terminal further comprises:
      receiving, from a user computer, a transaction identifier.

17. The computer program product of claim 16, wherein the receiving the record of the first transaction concluded on the sale terminal further comprises:
   retrieving the record of the first transaction using the transaction identifier.

18. A method of operating a computer system, the computer system including one or more processors and one or more memory devices operably coupled to the one or more processors, the one or more memory devices storing executable and operational code effective to cause the one or more processors and the one or more memory devices to operate as a savings module, a fraud detection module, a validation module and a redemption module, the method comprising:
   receiving, at the savings module, a record of a first transaction concluded on a sale terminal, the record including a user identifier, one or more item identifiers and a price paid for each item identifier of the one or more item identifiers;
   storing the record of the first transaction in a user record as user transaction data, the user record also including a return history for a user, and a network history of the user representing a history of electronic interactions of the user with a server system;
   subsequent to the first transaction, identifying, by the savings module, for the each item identifier of at least a portion of the one or more item identifiers, a third party record, the third party record corresponding to the each item identifier and having a third party price for the each item identifier;
   subsequent to the first transaction, identifying, by the savings module, one or more discounted identifiers of the one or more item identifiers, the third party prices of the third party records corresponding to the one or more discounted identifiers being less than the price paid for the one or more discounted identifiers by one or more price differences;
   evaluating, by the fraud detection module, recent shopping activity associated with the user identifier;
   evaluating, by the fraud detection module, historical shopping activity associated with the user identifier based on a plurality of inputs including (1) the user transaction data, (2) the return history, and (3) the network history, the historical shopping activity including shopping activity preceding the recent shopping activity;
   determining, by the fraud detection module, whether a difference between the recent shopping activity and the historical shopping activity indicates fraud based on the inputs, wherein the historical shopping activity is associated with a first time period that precedes a second time period associated with the recent shopping activity, wherein the determining whether the difference between the recent shopping activity and the historical shopping activity of the user indicates fraud further comprises:
      responsive to the inputs, determining that the historical shopping activity indicates a first frequency of purchase transactions;
      determining that the recent shopping activity indicates a second frequency of purchase transactions;
      evaluating whether a first difference between the second frequency of purchase transactions and the first frequency of purchase transactions exceeds a first threshold value, as defined by $R_1-H_1>T_1$, where $R_1$ is the second frequency of purchase transactions, $H_1$ is the first frequency of purchase transactions, and $T_1$ is the first threshold value;
      responsive to the inputs, determining that the historical shopping activity indicates a first frequency of return transactions during the first time period;
      determining that the recent shopping activity indicates a second frequency of return transactions during the second time period;
      evaluating whether a second difference between the second frequency of return transactions and the first frequency of return transactions exceeds a second threshold value, as defined by $R_2-H_2>T_2$, where $R_2$ is the second frequency of return transactions, $H_2$ is the first frequency of return transactions, and $T_2$ is the second threshold value;
      determining that the historical shopping activity indicates purchases among a first plurality of categories;

determining that the recent shopping activity indicates purchases among at least one second category;

evaluating whether the at least one second category belongs to one of the first plurality of categories;

determining that the historical shopping activity indicates online activity during the first time period from at least one of a first device, a first browser type, or a first internet protocol address;

determining that the recent shopping activity indicates online activity during the second time period from at least one of a second device, a second browser type, or a second internet protocol address;

evaluating a third difference between (i) the first device, the first browser type, or the first internet protocol address and (ii) the second device, the second browser type, or the second internet protocol address;

determining that the historical shopping activity indicates a first average credit per transaction during the first time period based on third party pricing data;

determining that the recent shopping activity indicates a second average credit per transaction during the second time period based on the third party pricing data; and evaluating whether a fourth difference between the second average credit per transaction and the first average credit per transaction exceeds a third threshold value; and when the difference between the recent shopping activity and the historical shopping activity indicates fraud, associated with transactions or return transactions, generating, by the fraud detection module, a flag with respect to the first transaction;

receiving, by the validation module, a validation decision;

when the validation decision indicates approval, crediting, by the validation module, an account associated with the user identifier with an amount corresponding to the one or more price differences;

when the validation decision indicates rejection, refraining from crediting the account associated with the user identifier with the amount corresponding to the one or more price differences;

when the difference between the recent shopping activity and the historical shopping activity does not indicate fraud, crediting the account associated with the user identifier with the amount corresponding to the one or more price differences;

when the difference between the recent shopping activity and the historical shopping activity does not indicate fraud and the validation decision indicates acceptance, perform at least one of: (i) crediting the account associated with the user identifier with the amount corresponding to the one or more price differences, (ii) generating a redemption code having the amount corresponding to the one or more price differences and receive a request to redeem the redemption code from the user associated with the user identifier, or (iii) issuing a gift card to the user associated with the user identifier;

receiving transaction information related to a second transaction subsequent to the first transaction at the sale terminal;

transmitting an authorization to the sale terminal when the transaction information is valid, the authorization allowing the sale terminal to apply an amount to be credited to the second transaction subsequent to the first transaction; and applying the amount of credit in the account associated with the user identifier toward a purchase price of the second transaction subsequent to the first transaction.

19. The method of claim 18, further comprising:

identifying a geographic location of the sale terminal at which the first transaction was concluded.

20. The method of claim 18, wherein the receiving of the record of the first transaction concluded on the sale terminal further comprises:

receiving, from a user computer, a transaction identifier.

21. The method of claim 18, wherein the evaluating whether a difference between the second average credit per transaction and the first average credit per transaction exceeds a third threshold condition indicates fraud, is defined by $R_3 - H_3 > T_3$, where $R_3$ is a recent return frequency, $H_3$ is a historical return frequency, and $T_3$ is the third threshold value.

* * * * *